Figure 1:
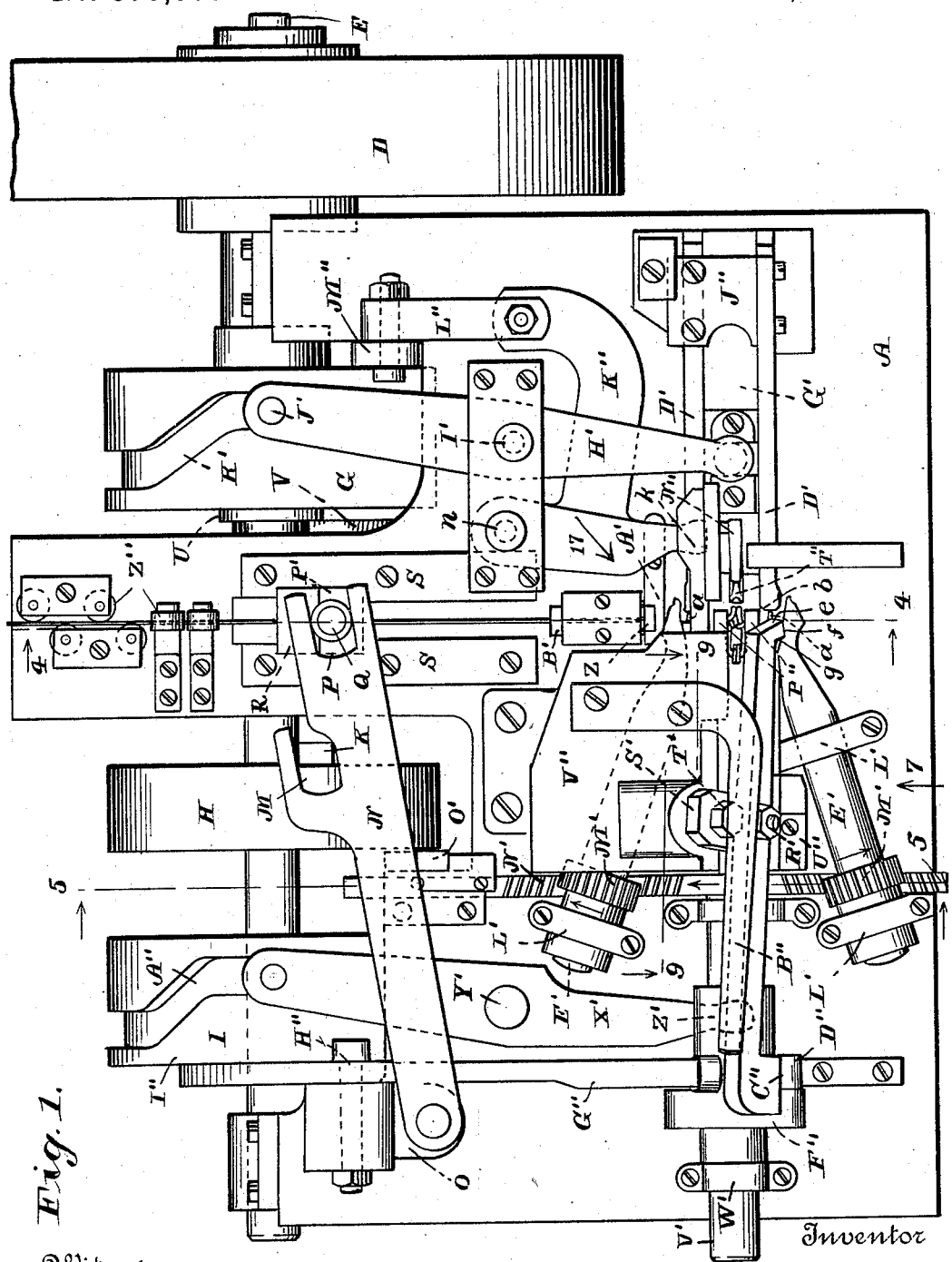

(No Model.)  11 Sheets—Sheet 1.

R. A. BREUL.
CHAIN MACHINE.

No. 578,689.  Patented Mar. 9, 1897.

Witnesses
R. H. Newman.
Harriet L. Slason.

Inventor
RICHARD A. BREUL
By Chamberlain & Newman
his Attorneys (No Model.)  R. A. BREUL.  11 Sheets—Sheet 4.
CHAIN MACHINE.

No. 578,689.  Patented Mar. 9, 1897.

Witnesses
R. H. Newman.
Harriet L. Slason.

Inventor
RICHARD A. BREUL
By Chamberlain & Newman
his Attorneys (No Model.) 11 Sheets—Sheet 5.

R. A. BREUL.
CHAIN MACHINE.

No. 578,689. Patented Mar. 9, 1897.

Witnesses
R. H. Newman
Harriet L. Hason

Inventor
RICHARD A. BREUL
By Chamberlain & Newman
his Attorneys (No Model.) 11 Sheets—Sheet 6.
R. A. BREUL.
CHAIN MACHINE.
No. 578,689. Patented Mar. 9, 1897.
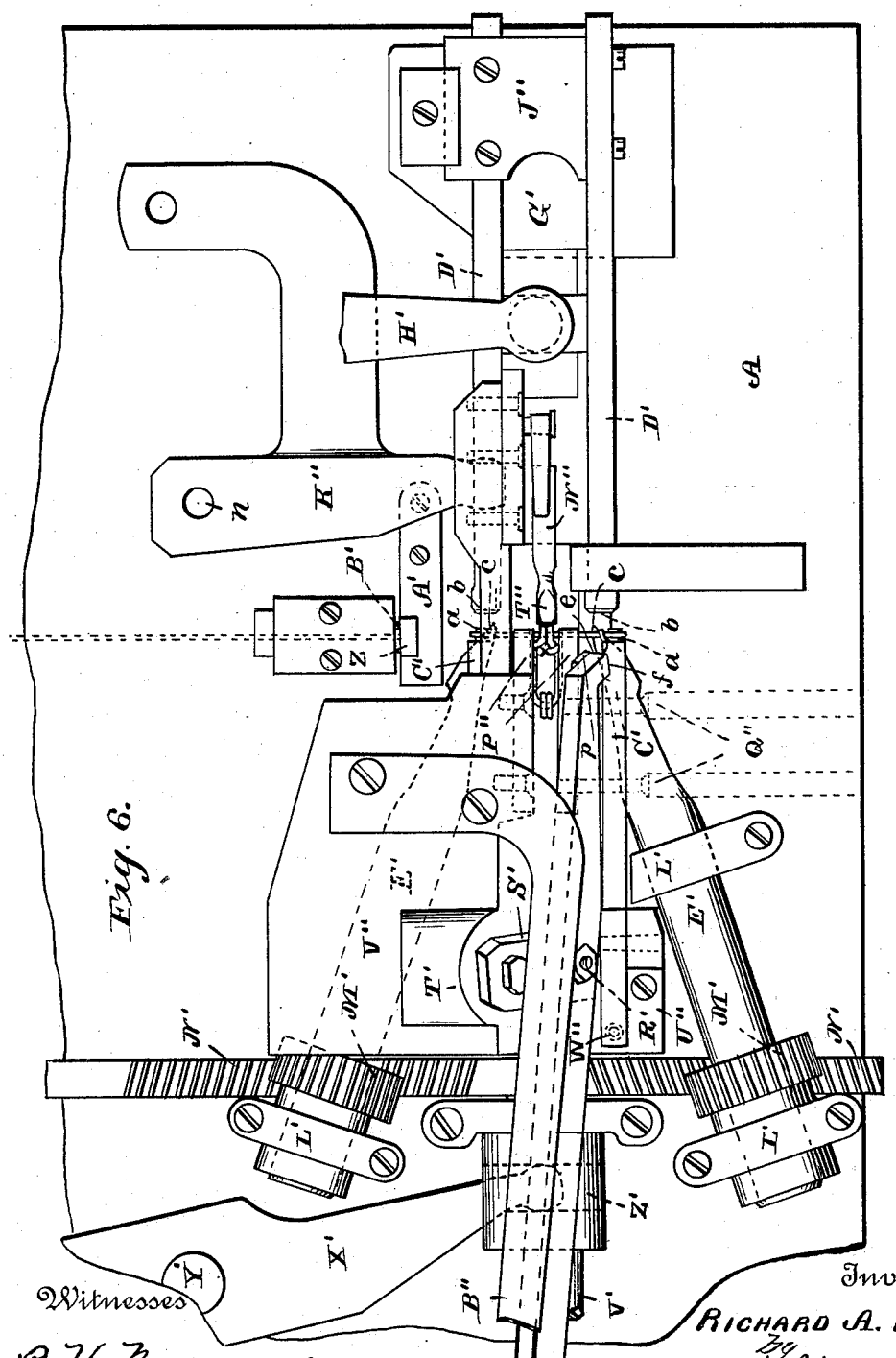
Witnesses
R. H. Newman.
Harriet L. Slason
Inventor
RICHARD A. BREUL
by
Chamberlain & Newman
his Attorneys

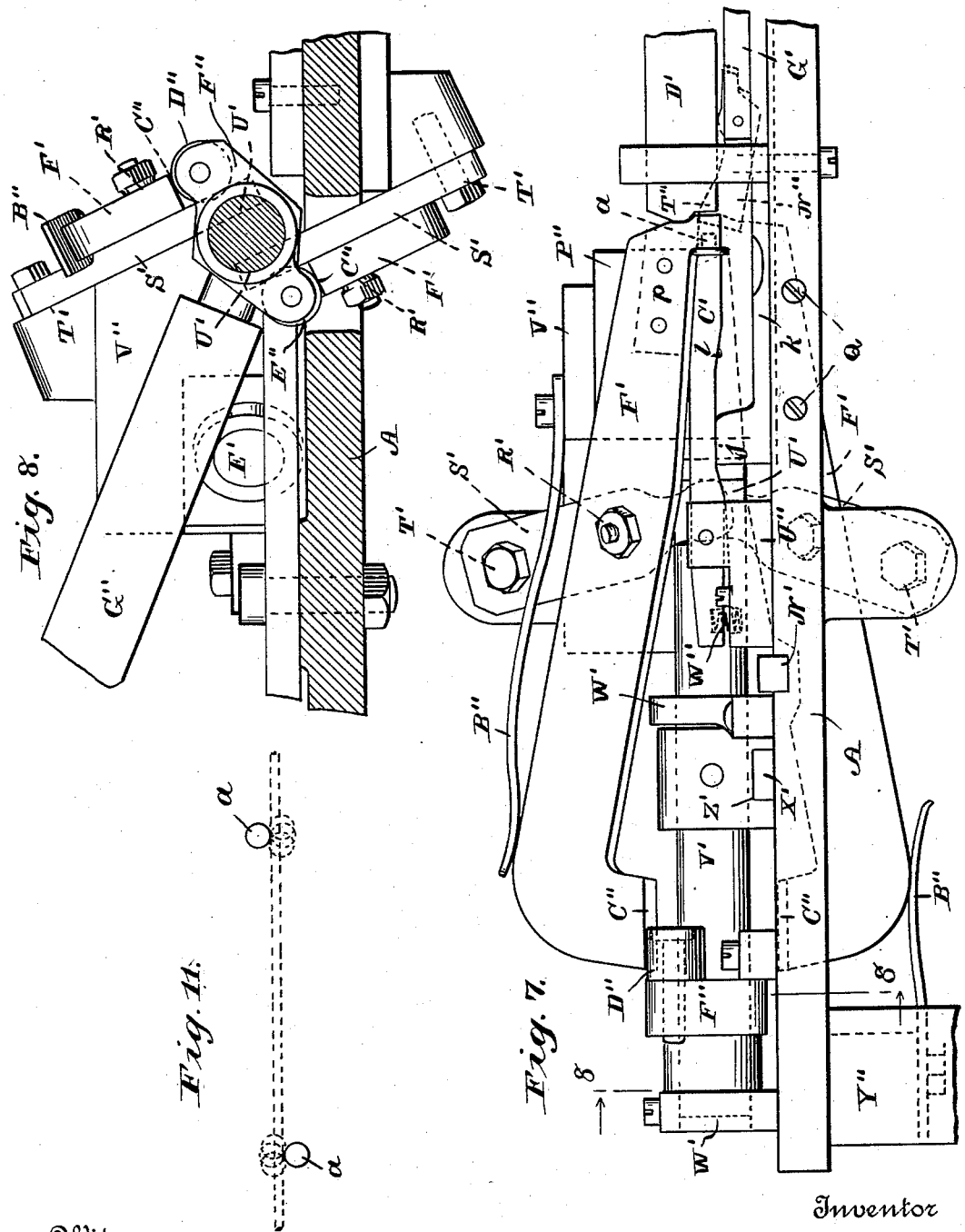

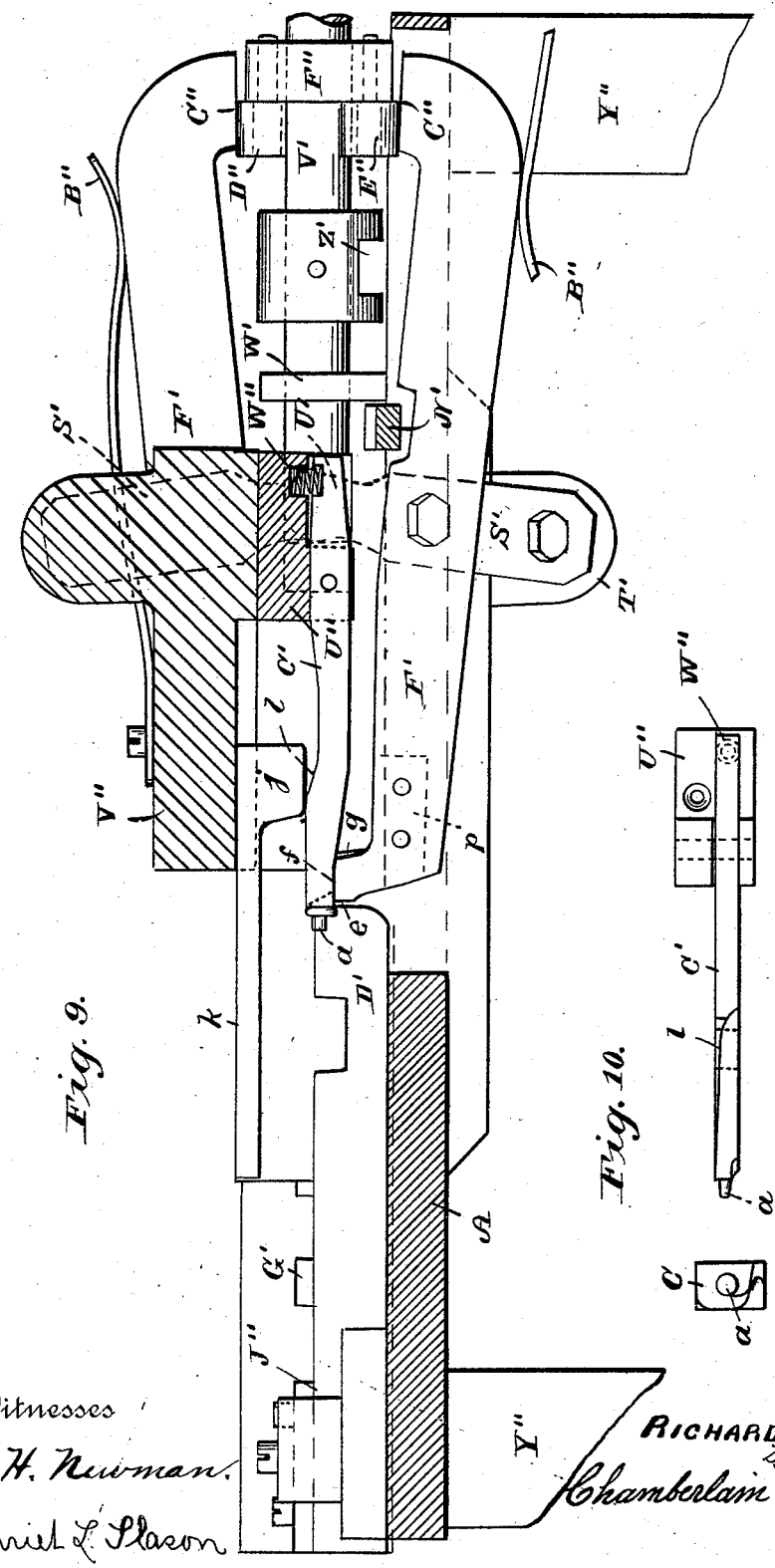

(No Model.)  11 Sheets—Sheet 9.
R. A. BREUL.
CHAIN MACHINE.
No. 578,689.  Patented Mar. 9, 1897.
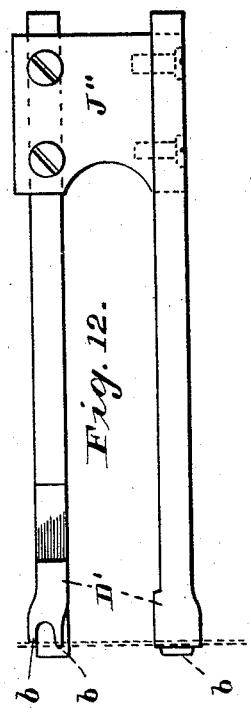
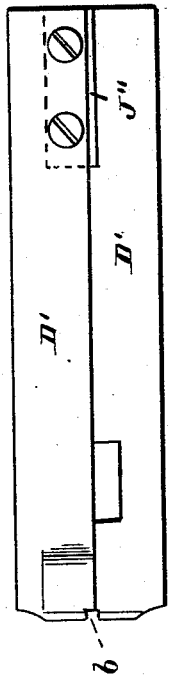
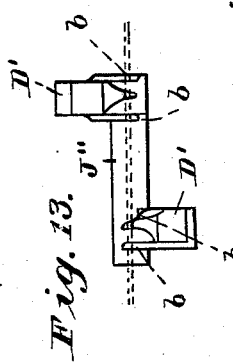
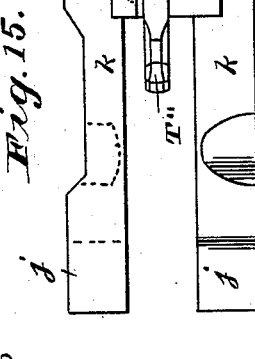
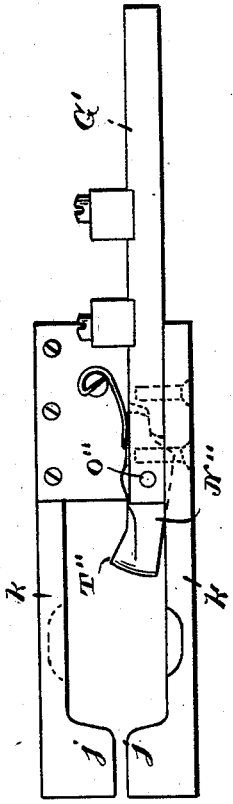
Witnesses
R. H. Newman
Harriet L. Slason
Inventor
RICHARD A. BREUL
By Chamberlain & Newman
his Attorneys

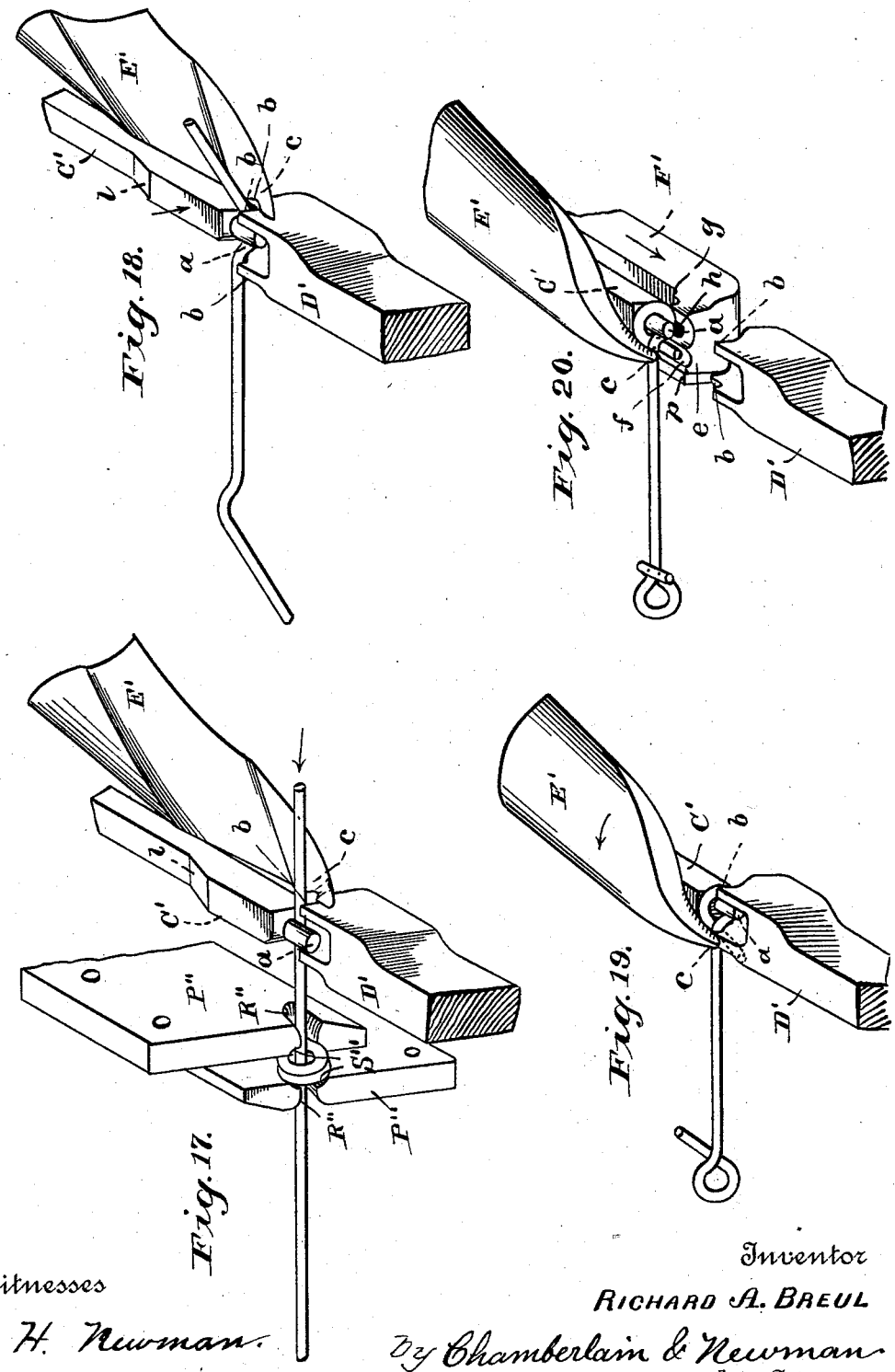

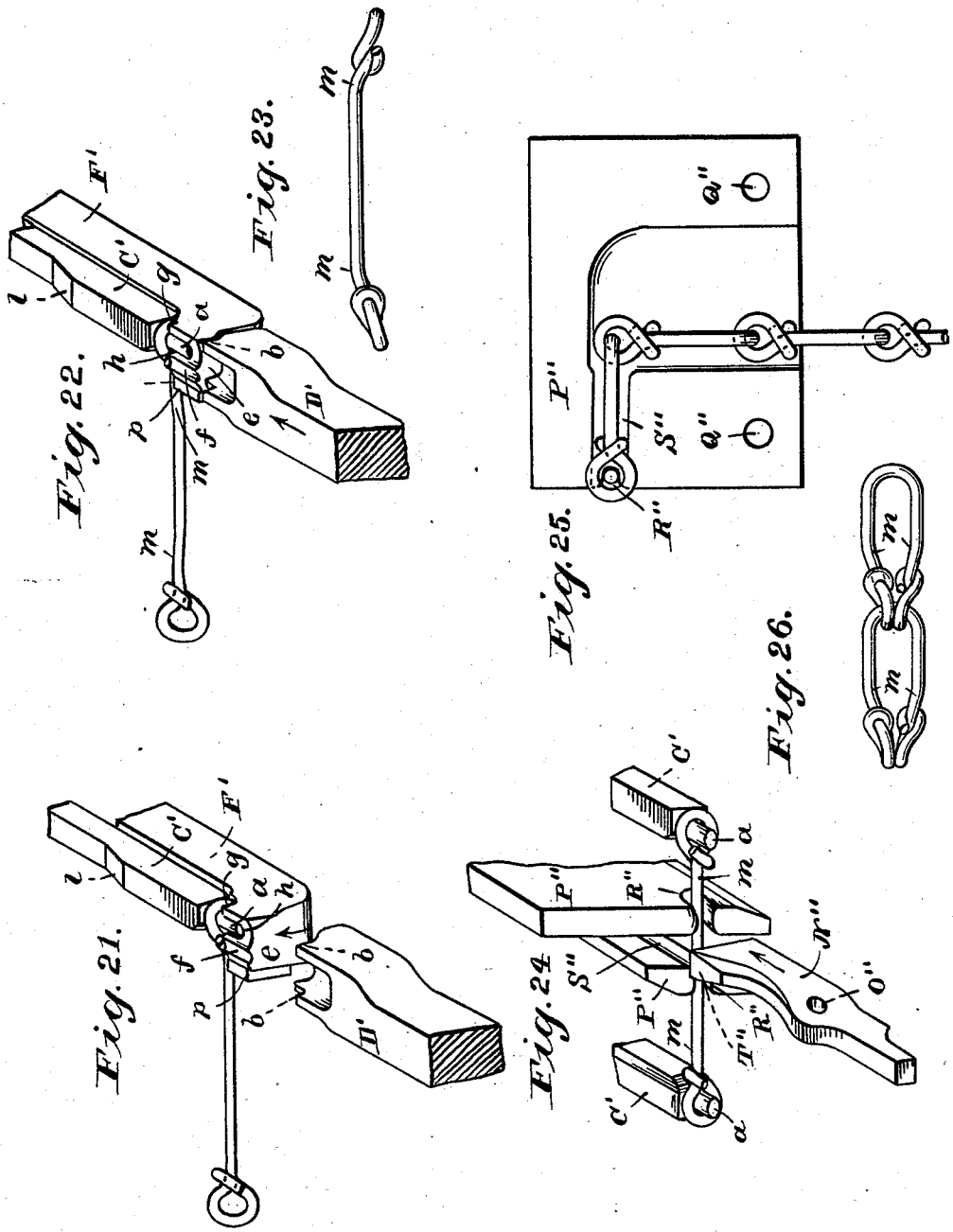

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

CHAIN-MACHINE.

SPECIFICATION forming part of Letters Patent No. 578,689, dated March 9, 1897.

Application filed September 19, 1895. Serial No. 562,936. (No model.)

*To all whom it may concern:*

Be it known that I, RICHARD A. BREUL, a citizen of the United States, residing at Bridgeport, in the county of Fairfield, in the State of Connecticut, have invented certain new and useful Improvements in Machines for Making Chains, of which the following is a specification.

My invention relates to that class of chain-machines in which the links are successively formed from wire fed to the machine from a coil, cut up into lengths, bent into proper form, joined to previously-formed links, and delivered from the machine in a completed condition.

One object of my invention is to provide a machine for making chain like that shown in my application for patent, Serial No. 575,510, filed January 14, 1896, in which each link is formed from a single piece of wire bent to form a loop having an eye at one end formed by curving the free ends of the wire in opposite directions in planes perpendicular to the plane of the loop to form two coincident coils, the free end of each of which is bent around or hooked to the same side of the loop on which it is situated. A chain so constructed possesses many advantages, which are fully set forth in my application for patent above mentioned.

Another object of my invention is to simplify the construction of machines of this class and to reduce the number of operations required to effect the several bends necessary to form a link.

Another object of my invention is to so organize the operative parts of the machine that they may be exposed to view in order that the successive operations may be observed and any imperfection in the work readily detected.

In my improved machine four sets of tools only are employed for forming the eyes of the links, and the strain or power necessary to perform the operations is greatly reduced, and there is an absence from my machine of any tendency to chafe off portions of the wire or form burs, as is common in other machines of this class. Only sufficient power is employed to operate the mechanism when subjected to the usual strain. The machine will therefore stop as soon as any displacement of the wire or tools takes place, because the force necessary for making wrong bends or overcoming obstructions requires more power than is supplied.

The accompanying drawings show the best way now known to me of carrying out my invention. The driving-shaft end of the machine is the rear end.

Figure 2:
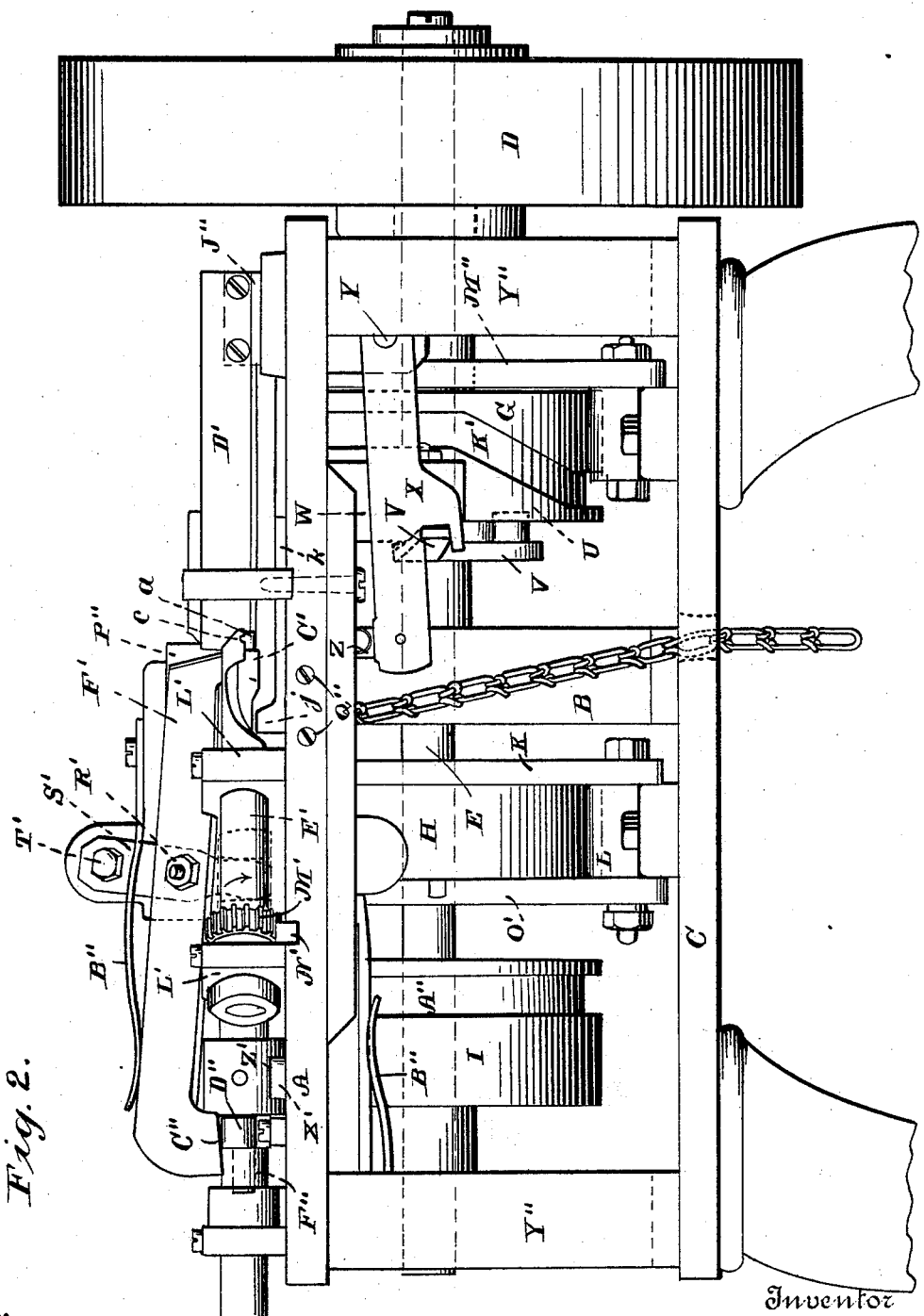
Figure 3:
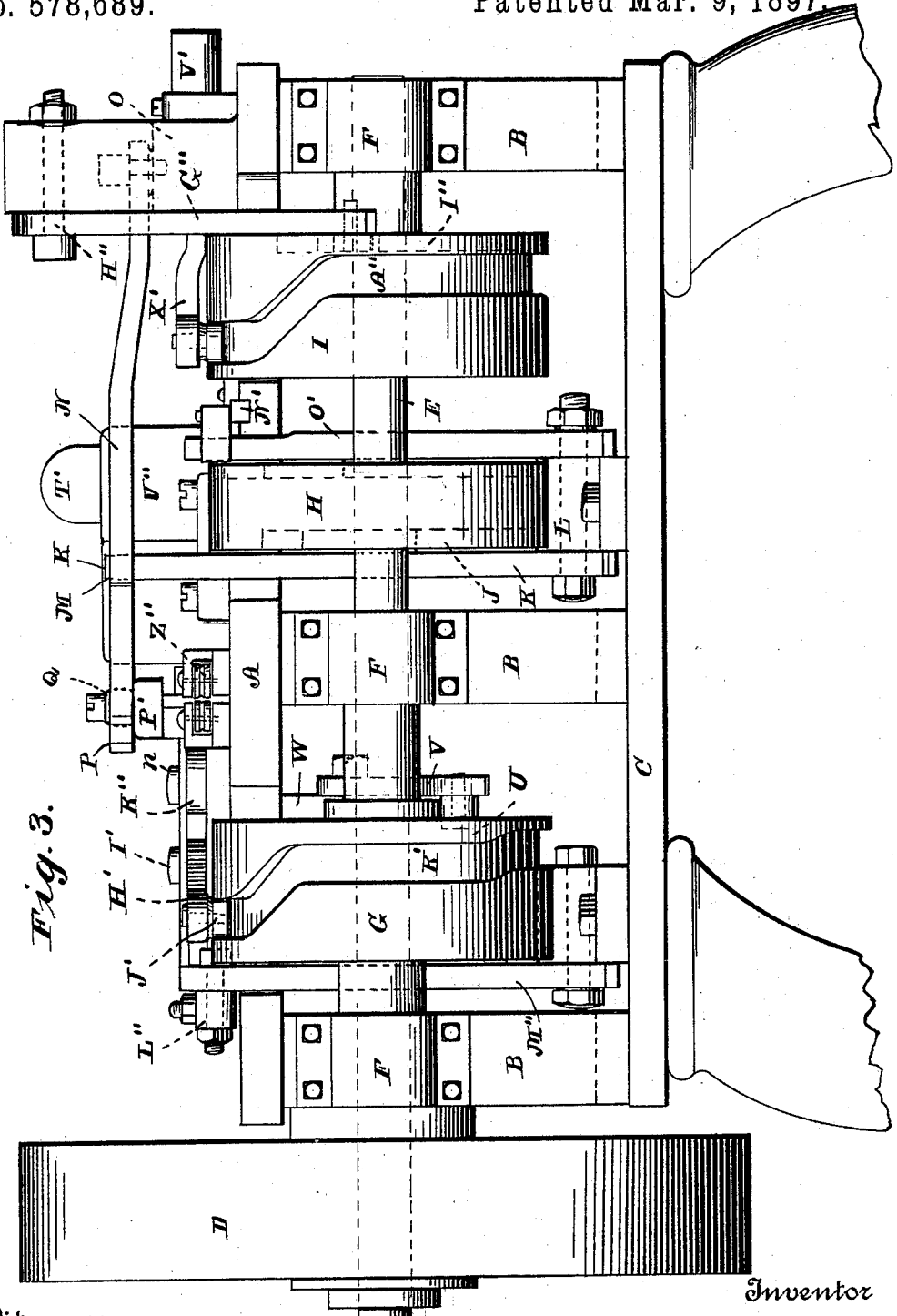
Figure 4:
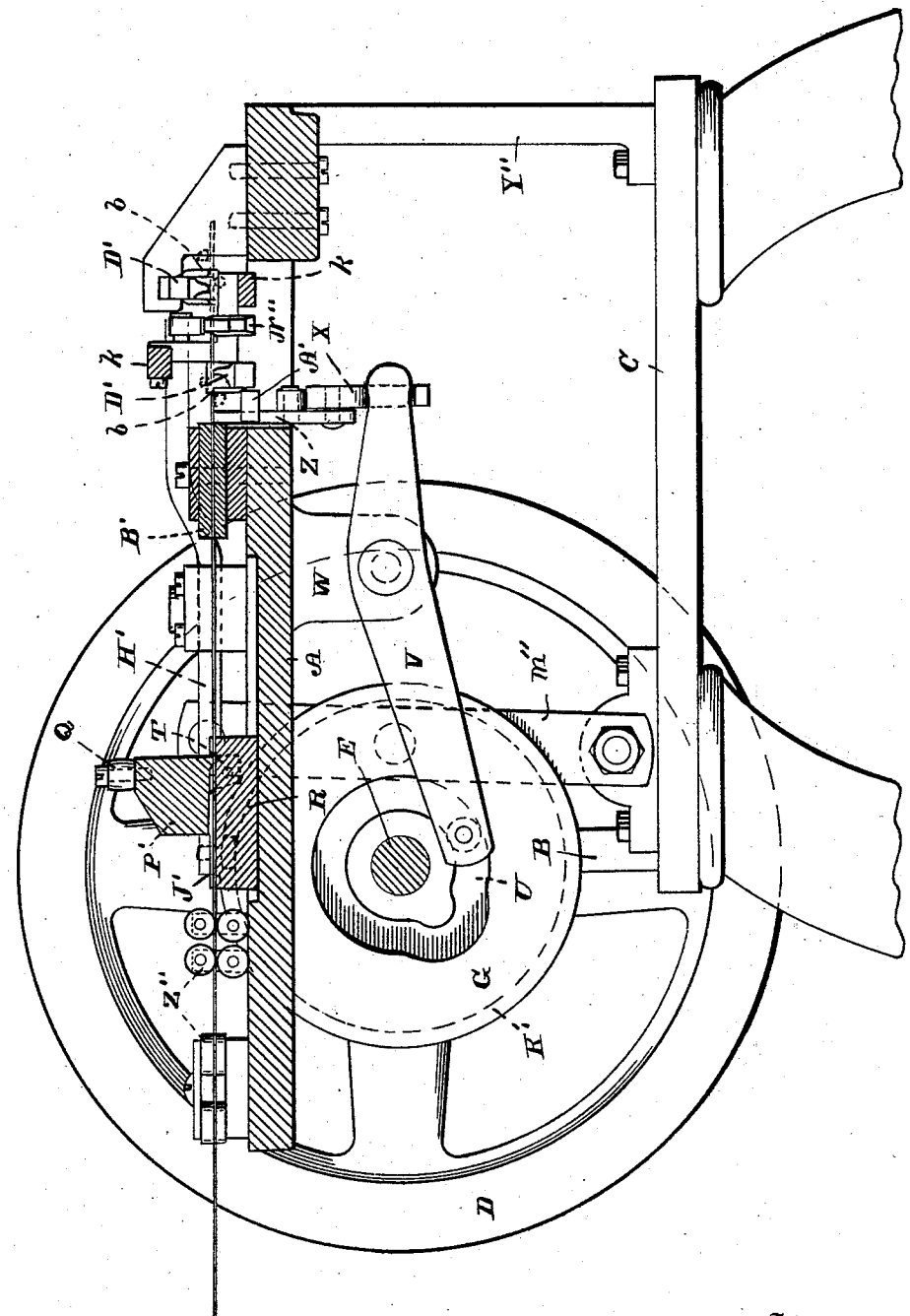
Figure 5:
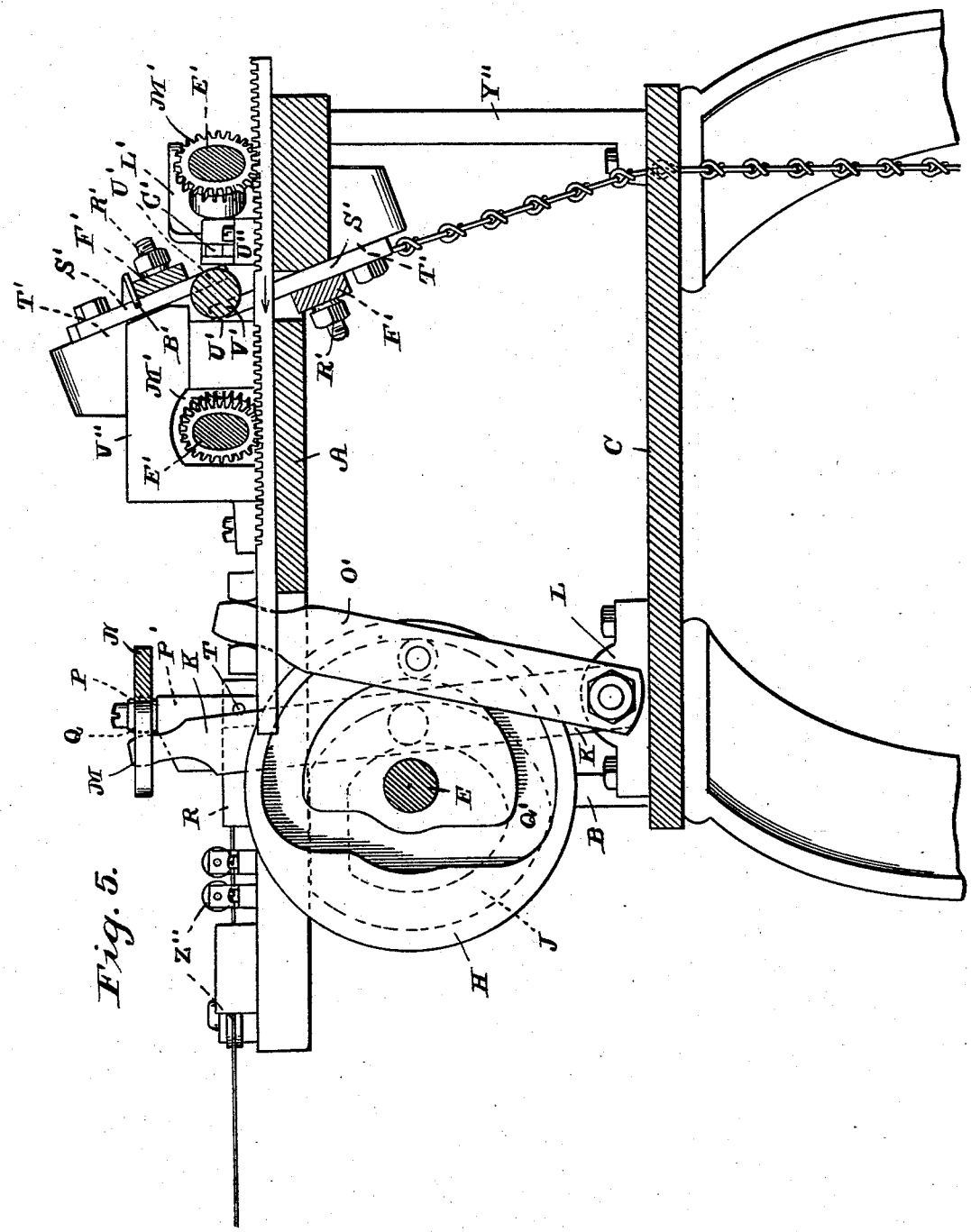

Figure 1 shows a plan view of the machine. Fig. 2 shows a front elevation thereof; Fig. 3, a rear elevation. Fig. 4 shows a transverse section on the line 4 4 of Fig. 1, looking in the direction of the arrow. Fig. 5 shows a cross-section on the line 5 5 of Fig. 1, looking in the direction of the arrows. Fig. 6 is an enlarged detail plan view of the mechanism employed for forming the links. In this view the mechanism is in a different position from that shown in Fig. 1. Fig. 7 shows an enlarged detail front elevation looking in the direction of the arrow 7 in Fig. 1. Fig. 8 shows a detail transverse section on the line 8 8 of Fig. 7, looking in the direction of the arrows. Fig. 9 shows an enlarged detail sectional view on the line 9 9 of Fig. 1, looking in the direction of the arrows. Fig. 10 shows an enlarged end view and a plan view, respectively, of the swinging mandrels, around the studs of which the coils of the link are formed. Fig. 11 is a diagram illustrating by full lines the normal position of the studs of the mandrels and by dotted lines the three other positions which the studs assume during the bending of the coils. Figs. 12, 13, and 14 are respectively a plan, an end elevation, and a side elevation of a slide and rammers secured thereto. Figs. 15 and 16 show a plan view and a side elevation, respectively, of a slide carrying devices for operating the loop-former and the swinging mandrels. Figs. 17 to 22, inclusive, show perspective views looking in the direction of arrow 17 in Fig. 1 and are designed to illustrate the successive steps in the operation of the mechanism for forming the links. Fig. 17 shows the first step after the wire blank is fed to position. Fig. 18 illustrates the manner of forming the first bend; Fig. 19, the manner of coiling the ends of the wire to form the eyes. Fig. 20 shows the manner of clenching the ends of the coils. Fig. 21 indicates the second movement of the clenching devices. Fig. 22 illustrates the operation of the rammers in giving final shape to the ends of the coils. Fig. 23 shows a partially-formed link after having been operated upon by the rammers. Fig. 24 shows the mechanism for forming the loop. Fig. 25 is a detail view of one of the loop-forming dies. Fig. 26 shows a plan view of two completed and connected links.

The bed-plate A is supported on posts B and Y'', rising from the base C, which is in turn supported on suitable legs, as shown. A power-shaft E is mounted in bearings F, and it carries a driving-pulley D and cams G, H, and I, from which motion is transmitted by suitable connecting mechanism to tools which form the link. The wire is fed from the coil beneath a clamp P', hinged at T to a slide R, which is moved back and forth between guides S. A lever N, pivoted to a bracket O on the main frame, is forked at P and embraces a roller Q, secured to the clamp P'. This lever is operated by a lever K, which enters a recess M in said first-mentioned lever and which has its lower end hinged to a bracket L, secured to the base of the machine. A roller on the lever K enters a cam-groove J in the cam H. By this means the wire in proper lengths is fed forward through straightening-rolls Z'' and through a bushing B'.

The feeding mechanism is substantially the same as that heretofore employed. It is so arranged that on the forward movement of the clamp P' the wire will be grasped and fed forward, while on its backward movement the clamp P' will open and slide over the wire without moving it. The wire having been fed forward is cut to the desired length for forming a single link. The cutter Z for this purpose is arranged to move vertically between a guide A' and the bushing B', through which the wire is fed and across the end of which the cutting-die operates. The cutter is connected with a lever X, pivoted at Y to the main frame and operated by a transversely-arranged lever V, hinged on a hanger W and having a roller working in a cam-groove U in the cam G. The cutting and feeding mechanisms are so arranged that the cutter acts upon the wire immediately after a sufficient amount has been fed in to form a link.

Fig. 17 illustrates the position of a blank after it has been severed from the supply. It is then held in position by the mandrels C', the rammers D', and the coilers E', and also by the loop-forming mechanism, the blank being arranged to pass through the eye of a previously-formed link, as indicated. Fig. 17 shows only one set of bending devices, which operate upon one end of the blank. There is another similar set for acting on the other end of the blank, as is clearly shown by other figures of the drawings.

The wire at one end of the blank rests beneath the stud a on the mandrel and upon a guide b on the rammer D' and on a seat c of the coiler E'. On the opposite side of the blank the wire rests in a guide b and seat c and is arranged above a stud a, the organization being such that when the wire is fed in it passes beneath a stud a of one mandrel and above the stud a of the other mandrel, so that when the mechanism operates the ends of the wires may be bent in opposite directions to form a link having the advantages set forth in my application for patent above mentioned.

The mandrels C' are pivoted to blocks U'', secured to the bed A and the bracket V''. The mandrels are so connected to the blocks that they may have both a slight vertical and lateral play against the force of the springs W'', which tend to retain the mandrels in their normal position, which is that indicated by the circles in full lines in Fig. 11. The vertical and lateral movements of the mandrels are brought about by the action of the several bending-tools, and this yielding of the mandrels facilitates the operation of the several tools in forming the coils, as it will be understood that the coils are formed around the studs a, and the coils do not leave these studs until the eyes are completed and the link is bent to form the loop. The mandrels C' are moved positively vertically by means of cams j on arms k, projecting from a slide G'. These cams j operate on cam-surfaces l of the mandrels, one of the mandrels having this cam-surface on its upper surface and the other one on its under side, the arrangement being such that when the slide G' operates one of the mandrels is depressed and the other one is elevated, the effect being to bend the wire blank into the form shown in Fig. 18. The slide G' reciprocates in guides on the bed-plate and is operated by means of a lever H', pivoted at I' and provided with a roller J', engaging a cam-groove K' in the cam G.

When the wire is bent to the form shown in Fig. 18, the rammers D' are arranged close to the mandrels, the studs a entering recesses in the ends of the rammers, and the ends of the wire blank project beyond the ends of the coilers E'. When the parts are in this position, the coilers are operated in the manner illustrated in Figs. 18 and 19 to bend the ends of the wire to form a coil at each end of the blank.

The coils are completely formed with their ends projecting across the connecting-wire, as shown in Fig. 19. These ends while arranged on the same side of the wire project therefrom in different directions. The operative ends of the coilers are cut away and recessed, as shown, and are adapted to be moved in the arc of a circle over the top of a mandrel or under it. The coilers are arranged in substantially the same horizontal plane, but their axes are arranged at an angle with each other and with the axes of the mandrels. They converge toward the right-hand end of the machine, as shown in Fig. 1, and diverge outwardly from the studs $a$ toward the left-hand end of the machine. The coilers are mounted in bearings L' and are provided near their rear ends with pinions M', engaging teeth in a transversely-reciprocating rack-bar N', operated by a vertical lever O', hinged to a bracket L on the base-piece C and provided with a roller working in a cam-groove Q' in the side of the cam H. By the reciprocation of the rack-bar N' a partial rotation is given to the coilers, it being about a half-turn, just sufficient to bend the ends of the wire from the position shown in Fig. 18 to that shown in Fig. 19. As the coilers are arranged at an angle relatively to the studs $a$ they will act upon the ends of the wire to bend them about the studs $a$ in an improved manner.

Heretofore the ends of the wire have been bent by devices whose axes were parallel with the axes of the studs $a$ and the ends of the wire were bent in planes nearly parallel with the plane of the connecting-wire, but by my improved coilers arranged at an angle, as shown, the ends of the wire are bent spirally or in a curved line, sliding longitudinally on the ends of the coilers and making the bending more natural and easy than is the case where the ends of the wire are bent straight across. As soon as the eyes are formed in the manner shown in Fig. 19 clenching devices are brought into operation, which turn the projecting ends of the coils around the connecting-wire in the manner shown in Figs. 20, 21, and 22.

The clenching-levers F' are pivoted at R' to levers S', which latter are hinged to studs T', projecting from the bed A, and a bracket V'' on the bed. The inner ends of the levers S' engage recesses U' in a slide-bar V'. This slide-bar is mounted to move in guides W', secured to the bed-plate, and is operated by means of the lever X', pivoted at Y' to the bed and engaging a recess Z' of a collar secured to the bar. The rear end of the lever X' is provided with a roller to engage a cam-groove A'' of the cam I. Springs B'' engage the clenching-levers and serve to force their ends C'' against rollers D'' and E'', mounted on the rocker-arm F'', which latter is loosely mounted on the before-mentioned slide-bar V'.

A roller on the forward end of a lever G'' engages with the roller E'' of the rocker-arm, and at its opposite end it is provided with a roller engaging a cam-groove I'' in the cam I. When operated upon by the cam, the lever G'' will be turned on its pivot H'', and its forward end will operate upon the roller E'' and rock the arm F'', moving the levers F' against the action of the springs B''. When the slide V' is operated by the lever X', the clenching-levers F' are moved forward to the position shown in Fig. 20, thereby bending the ends of the coils from the position shown in Fig. 19 to that shown in Fig. 20. When the rocker-arm F'' is thus operated in the manner before described, the levers F' are moved to the position shown in Fig. 21, causing the ends of the wire to be bent around the connecting-wire of the link.

The next operation in the formation of the link is that which bends the end portions of the wires more completely around the main or connecting wire and against the ends of the coils. This operation also includes the special formation of the connecting-wire near the coils, whereby it is so shaped that a single operation of the loop-forming device will complete the link, and the employment of the setting devices heretofore used is avoided. The rammers D' are secured to the slide J'', as shown clearly in Figs. 12, 13, and 14. The rammers move within the limits shown in Figs. 1 and 6. They are operated by a bell-crank lever K'', pivoted at $n$ to the bed-plate and provided with a link L'', operatively connected with a vertical lever M'', having a roller engaging a cam-groove upon the outside of the cam G. By the operation of the rammers the ends of the coils are clenched and the connecting-wire bent or shaped at $m$, as shown clearly in Fig. 23, which operation also to some extent takes the spring out of the wire, so that when bent by the loop-former the link will retain the form given to it and will not tend to spring back.

The clenching-levers F' are each formed with three operating-surfaces $e, f,$ and $g$, and each is provided with a lug $p$. A recess $h$ is also provided in each clenching-lever to receive the stud of the corresponding mandrel. The functions which the recesses $e, f,$ and $g$ and the lugs $p$ perform are indicated by the drawings, Figs. 17 to 24, inclusive. The lugs $p$ serve the special purpose of bending the wires at $m$, as indicated in Fig. 23. The mandrels, it will be observed, are slightly beveled at their ends in order that when the rammers act upon the ends of the clenching-levers and clamp the coils between the upturned ends of the clenching-levers and the ends of the mandrels the coils may be turned in the manner indicated in Fig. 23. The formations of those parts of the tools which come into contact with the wire blank at different stages of the operations are such as to facilitate the formation of the link.

The mechanism for forming the loop to complete the link is illustrated particularly in Figs. 1, 6, 14, 15, 16, and 24. A former N'' is pivoted at O'' on the slide G' and is held in its normal position by a spring attached to the slide. This former operates in connection with two dies P'', attached by means of screws Q'' to the frame of the machine. These dies are provided with recesses R'' to accommodate the wire blank and with grooves S'' to receive the links and hold and retain them while the wire blank is being fed into the eye of the link last completed.

In operation the end T'' of the former acts upon the wire between the coils and forces it between the dies P''. By a single operation it completes the link, and when it retreats the former is forced downward against the action of its spring and is freed from its position within the loop. Upon the return movement of the slide it assumes its normal position against the end of the eye of the completed link. The link-blank is supported by the studs $a$ until the coils are completely formed and the extremities of the wire are tightly clenched. When thus completed, as shown in Fig. 24, the former N'' advances, forces the connecting-wire between the dies P'', and the coils leave the studs $a$, the mandrels yielding slightly to permit of the withdrawal of the coils.

It will now be understood how simple is the mechanism employed for forming wire chain according to my present invention, and it will be perceived that many parts heretofore employed and thought to be necessary are omitted. Not only is the machine simple in construction and operation, but a link of an improved construction is produced thereby. However, my improvements are not limited to the production of a link of this character, as there are numerous combinations of mechanism involved in my machine which are useful in forming links of a different shape.

No further description of the operation of the mechanism seems necessary, as the successive steps in the formation of the links and the chain have been followed in describing the construction of the mechanism, and the successive steps in the process are clearly illustrated in Figs. 17 to 24 of the drawings.

I claim as my invention—

1. A machine for making wire chain, comprising mechanism for forming the initial bends at opposite ends of a wire blank, and rotary coilers having their axes arranged at an angle to each other and also to the mechanism which forms the initial bends and which act on the wire to bend it in a spiral path around the mandrels.

2. A machine for making wire chain, comprising mandrels about which the coils of the link are formed, coilers arranged at angles to the axes of the mandrels, and means for partially rotating the coilers to bend the ends of the wire blank around the mandrels.

3. A machine for making wire chain, comprising mandrels about which the wire blank is coiled, means for feeding the wire into position on one side of one mandrel and on the opposite side of the other mandrel, mechanism for then bending the wire about the mandrels to form eyes at each end of the blank, and the loop-forming mechanism between the mandrels for forming the loop and bringing the eyes together.

4. A machine for making wire chain, comprising mandrels about which the wire blank is coiled, means for feeding the wire into position on one side of one mandrel and on the opposite side of the other mandrel, coilers for bending the ends of the wire in opposite directions around the mandrels, clenching devices for closing the ends of the wire and means for forming the loop.

5. A machine for making wire chain, comprising mandrels about which the coils of the link are formed, rotary coilers having their axes arranged at angles to the axes of the mandrels, means for operating the coilers, and mechanism for further bending the ends of the wire projecting from the coils.

6. A machine for making wire chain, comprising the mandrels about which the wire is coiled, supports for the wire, means for moving the mandrels vertically, devices coöperating with the mandrels to bend the wire, and devices for then further bending the wire to complete the coils.

7. A machine for making wire chain, comprising the mandrels, free to move both vertically and laterally, devices for bending the ends of the wire blank about the mandrels, means for bending the wire near each coil to cause the coil to assume angles to the axis of the wire, and the loop-forming mechanism.

8. A machine for making wire chain, comprising the mandrels adapted to move in opposite directions, means for moving the mandrels in opposte directions, mechanism coöperating with the mandrels to act upon a wire blank to bend the ends thereof in opposite directions, and mechanism for completing the coils of the link.

9. A machine for making wire chain, comprising the hinged mandrels about which the ends of a wire blank are coiled, means coöperating with the mandrels to bend the wire blank about their ends, a slide provided with extensions having cams acting upon the mandrels to move them in opposite directions, and means for operating the slide.

10. A machine for making wire chain, comprising the hinged mandrels, means coöperating therewith to give to the wire blank the initial bends, the slide having cams acting on the mandrels, the coilers having their axes arranged at angles to the axes of the mandrels, and means for partially rotating the coilers.

11. A machine for making wire chain, comprising the movable mandrels, means for moving them in opposite directions to bend the wire blank in opposite directions at its opposite ends, coilers for bending the ends of the wire to form the eyes at opposite ends of the blank, clenchers for further bending the extremities of the wire, and the loop-forming mechanism for completing the link.

12. A machine for making wire chain, comprising the mandrels about which the wire is coiled, means for coiling the wire about the mandrels, the clenching-levers, means for moving them in planes parallel with the axes of the mandrels, mechanism for then moving the clenching-levers transversely to the axes of the mandrels to further bend the extremities of the wire, and rammers acting upon the ends of the clenching-levers to complete the formation of the coil.

13. In a machine for making wire chain, the combination with the mandrels about which the wire is coiled, the coilers, means for giving them approximately a half-turn around the mandrels, clenching-levers whereby the ends of the wire are bent forward, inward, and returned against the connecting-wire of the link, and means for shaping the coils and the connecting-wire simultaneously with the clenching operation, substantially as described.

14. A machine for making wire chain, comprising the mandrels about which the ends of the wire blank are coiled, means for coiling the ends of the blank about the mandrels, the clenching-levers one of which is arranged above and the other below the mandrels, and mechanism for operating the clenching-levers.

15. A machine for making wire chain, comprising the hinged mandrels, means coöperating therewith to partially bend the wire blank, springs for holding the mandrels in their normal position, means for actuating the mandrels to partially bend a wire blank, and mechanism for curling the ends of the wire blank around the mandrels.

16. A machine for making wire chain, comprising mandrels about which the ends of a wire blank are coiled, the coilers having their working ends shaped to engage with the ends of the wire projecting from the mandrels, and having their axes arranged at an angle to each other and diverging from their working ends outwardly, pinions carried by the mandrels, and a reciprocating rack-bar engaging the pinions to give a partial turn to the coilers.

17. A machine for making wire chain, comprising mandrels about which the ends of a wire blank are coiled, means for coiling the ends of the wire about the mandrels, the clenching-levers, means for moving them forward in planes parallel with the axes of the mandrels, mechanism for then moving the ends of the clenching-levers transversely to the axes of the mandrels, and mechanism for forming the loop.

18. In a machine for making wire chain, the combination with means for forming the coils, of the clenching-lever herein described, provided with the recesses $e$, $f$ and $g$, and the lugs $p$.

19. In a machine for making wire chain, the rammers herein described, provided with the supports $b$, for the link-blank, in combination with the mandrels, the clenchers and the coilers, substantially as set forth.

20. A machine for making wire chain, comprising the mechanism for forming the coils at opposite ends of a wire blank, a loop-former pivotally connected with a reciprocating slide, and dies between which the former operates to form the loop.

21. A machine for making wire chain, comprising mechanism for forming coils at opposite ends of a wire blank, means for then bending the connecting-wire near the coils before the operation of the loop-forming mechanism to cause the coils to assume angles to the axis of the connecting-wire, a loop-former, and dies between which the connecting-wire is forced by the loop-former.

22. In a machine for making wire chain, the combination, substantially as set forth, of the mandrels about which the ends of a wire blank are bent, the rotary, diverging coilers, the pivoted clenching-levers, the rocker-arm having rollers engaging the clenching-levers, means for operating the rocker-arm, levers arranged transversely to the clenching-levers and to which they are pivotally connected, and means for operating said levers, the organization being such that the clenching-levers are moved both transversely relatively to the axes of the mandrels, and also in planes parallel therewith.

23. In a machine for making wire chain, the combination with mechanism for forming the coils, clenching-levers operating upon the projecting ends of the coils, the dies arranged between the clenching-levers and having recesses in their faces in which the loop is formed, and a loop-former operating between the dies.

24. The combination with mechanism for feeding the wire blank, of devices for forming the coils at opposite ends of the blank, mechanism for bending the connecting-wire near the coils, to cause the coils to assume angles relatively to the axis of the connecting-wire, and mechanism for then bending the connecting-wire to form the loop and thus complete the link.

25. The combination with the wire-feeding mechanism, of the mandrels, the clenchers and the rammers, each of which is provided with a support for the wire blank, and which receives the wire blank when it is fed into the machine.

Signed at Bridgeport, in the county of Fairfield and State of Connecticut, this 31st day of August, A. D. 1895.

RICHARD A. BREUL.

Witnesses:
C. M. NEWMAN,
R. H. NEWMAN.